(12) United States Patent
Bogrash et al.

(10) Patent No.: US 11,428,261 B2
(45) Date of Patent: Aug. 30, 2022

(54) FASTENER SYSTEMS FOR WOOD WITH OVERTIGHTENING AND LOOSENING PREVENTION

(71) Applicants: Philip Bogrash, Or Akiva (IL); Mark Bakker, Waddinxveen (NL)

(72) Inventors: Philip Bogrash, Or Akiva (IL); Mark Bakker, Waddinxveen (NL)

(*) Notice: Subject to any disclaimer, the term of this patent is extended or adjusted under 35 U.S.C. 154(b) by 0 days.

(21) Appl. No.: 16/342,002

(22) PCT Filed: Oct. 16, 2017

(86) PCT No.: PCT/IL2017/051140
§ 371 (c)(1),
(2) Date: Apr. 15, 2019

(87) PCT Pub. No.: WO2018/073817
PCT Pub. Date: Apr. 26, 2018

(65) Prior Publication Data
US 2020/0240458 A1 Jul. 30, 2020

(51) Int. Cl.
*F16B 39/282* (2006.01)
*F16B 39/10* (2006.01)

(52) U.S. Cl.
CPC .......... *F16B 39/282* (2013.01); *F16B 39/103* (2013.01)

(58) Field of Classification Search
CPC ........ F16B 37/00; F16B 37/047; F16B 39/10; F16B 39/103; F16B 39/14; F16B 39/24; F16B 39/282; F16B 39/34; F16B 39/36; F16B 43/00; B21D 47/00

USPC ........ 411/104, 147, 155, 427, 436, 531, 533
See application file for complete search history.

(56) References Cited

U.S. PATENT DOCUMENTS

| | | | | |
|---|---|---|---|---|
| 1,093,914 A | * | 4/1914 | Close | B21D 47/00 29/897.15 |
| 1,571,965 A | * | 2/1926 | Polson | E05B 83/243 292/109 |
| 2,494,298 A | * | 1/1950 | Jones | F16N 21/04 15/406 |
| 2,654,923 A | * | 10/1953 | Johnson | F16B 5/02 403/8 |
| 2,795,221 A | * | 6/1957 | Braendel | F02F 1/242 123/169 R |
| 3,192,981 A | * | 7/1965 | Oliver | F16B 37/047 411/176 |

(Continued)

*Primary Examiner* — Roberta S Delisle

(57) ABSTRACT

A replacement for cylindrical dowel nuts is provided and is a hollow cylindrical nut with a threaded hole on top and an unthreaded hole at the bottom which is for the threaded shank to enter. This hollow dowel nut elastically compresses during tightening to act like a lock-washer to prevent loosening. Several solutions are provided to make the top of the nut thicker to fit more thread coils than what wall thickness would otherwise permit. To improve loosening prevention further and also provide overtightening prevention a hollow nut with flatter bottom and a narrow gap bisecting the lower hole are used which during tightening cause right and left edges of said gap to be pushed towards the bolt strongly gripping it which prevents overtightening and loosening. "C" shaped nuts also provided which cause misalignment and jamming in the thread when compressed thereby also preventing loosening and overtightening.

5 Claims, 4 Drawing Sheets

(56) References Cited

U.S. PATENT DOCUMENTS

| | | | | |
|---|---|---|---|---|
| 3,507,314 | A | * | 4/1970 | Zartler .................... F16B 39/02 411/285 |
| 4,540,322 | A | * | 9/1985 | Coffia ................... F16B 31/021 411/338 |
| 6,357,980 | B1 | * | 3/2002 | Lansinger ............. F16B 37/041 411/171 |
| 6,417,449 | B1 | * | 7/2002 | Perez-Bonifacini ......................... F16B 7/0433 174/54 |
| 6,478,518 | B1 | * | 11/2002 | Hwang .................. F16B 12/14 411/104 |
| D642,899 | S | * | 8/2011 | Stevens .......................... D8/383 |
| 8,858,141 | B2 | * | 10/2014 | Williams ............. F16B 37/047 411/104 |

* cited by examiner

FASTENER SYSTEMS FOR WOOD WITH OVERTIGHTENING AND LOOSENING PREVENTION

RELATIONSHIP TO OTHER APPLICATIONS

The present patent application is related pursuant to the Concept of Unity of Invention to the US provisional applications 62/408,928 and 62/461,086 and claims benefit of filing date of provisional application 62/408,928 on Oct. 17, 2016.

1. FIELD OF THE INVENTION

This invention relates to fasteners; particularly to threaded fasteners and fastener systems primarily for wood intended to prevent loosening and overtightening.

2. DESCRIPTION OF THE PRIOR ART

Overtightening routinely results in damaging the wooden parts being held by the known threaded connections. Meanwhile the threaded connections are not tightened to high degree precisely to avoid cracking or otherwise damaging the wooden parts being joined, as a result the threaded connections especially the ones holding wooden parts subjected to varying and significant loads, such as in chairs, benches etc very often come undone and require re-tightening or commonly cause the wooden parts to break or be damaged when such connections come apart. Accordingly solutions for prevention of overtightening and loosening are required.

3. OBJECTS AND ADVANTAGES

One object of the present invention is to provide, for the threaded connections on wood a washer with teeth on its bottom for preventing its turning and a bendable upward flap(s) or tabs to prevent the nut or screw head from turning.

Another object of the present invention is to provide, for the threaded connections on wood a washer with teeth on its bottom for preventing its turning and a bendable upward bracket to prevent the round screw head from turning.

Another object of the present invention is to provide a washer to prevent the bolt or screw from being turned once its head's flat bottom surface reaches the washer, thereby preventing the break up of wood rifling that forms inside the hole when the threaded shank is screwed into it and thus loosening of the screw or bolt.

Another object of the present invention is to provide a washer with teeth and indentation along its perimeter line, whereas the bolt or screw's head has features designed to enter indentations along washer's perimeter and thus become reliably stopped upon completion of bolt/screw tightening.

Another object of the present invention is, for the threaded connections in wood requiring a cylindrical nut, to provide an elongated nut, whereas said nut is of rounded, elastically compressible cross-section which will act in the threaded connection as a substitute for the spring washer thereby preventing its loosening.

Another object of the present invention is, for the threaded connections in wood requiring a cylindrical nut, to provide an elongated nut, whereas said nut is of rounded, elastically compressible cross-section which when it compresses elastically will also increasingly jam the screw thereby preventing its over-tightening.

4. BRIEF DESCRIPTION OF THE DRAWINGS

FIG. 3A is a top view of washer with teeth and a radial cut for the thread line to pass through.

5. DESCRIPTION

Figure 1:
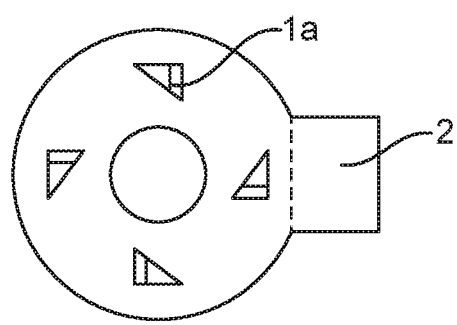
FIG. 1 is the top view of the toothed washer with a flap.
Figure 2:
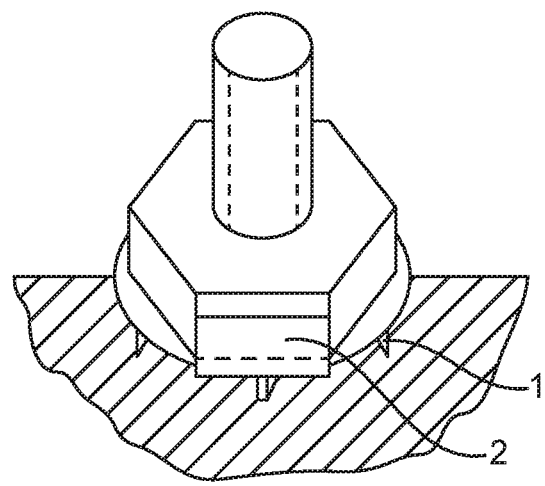
FIG. 2 is the isometric view of the assembly comprising toothed washer with flap.

The first embodiment of this invention (FIG. 1) is a washer for use with nuts it has a rounded base with at least one but preferably more, of two sided cutouts (1); the third side of each triangular cut-out is formed by means of the triangular shape delimited by two cuts being bent downward thereby forming a downwardly directed tooth (1a). There is a nut stopping element which is at least one flap (2) which is preferably slightly pre-bent upward for easier bending the flap upward (FIG. 2) once the tightening is completed. There can be many ways to implement the washer of this embodiment, but mutatis mutandis they are all considered to be within the spirit and scope of this invention.

Figure 3:
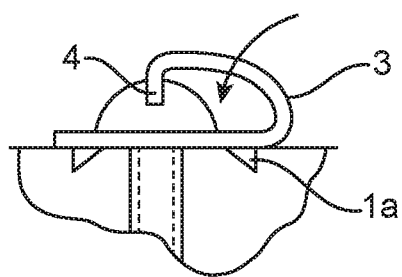
FIG. 3 is the side view of assembly comprising washer with bent upward stopper bracket with tip inserted into the screw socket.

The second embodiment of this invention (FIG. 3) comprises the base of the washer which is similar to the base of the washer of first embodiment, but instead of a flap(s) there is a different stopping element for the screw which is a bracket (3), the downward (after installing and bending) facing tip (4) of which is shaped like a screwdriver tip. Said tip (4) is for snugly entering the screw head's hexagonal socket or slit for screwdriver and is preferably slightly pre-bent upward. There can be many ways to implement the washer of this embodiment, but mutatis mutandis they are all considered to be within the spirit and scope of this invention.

Figure 3A:
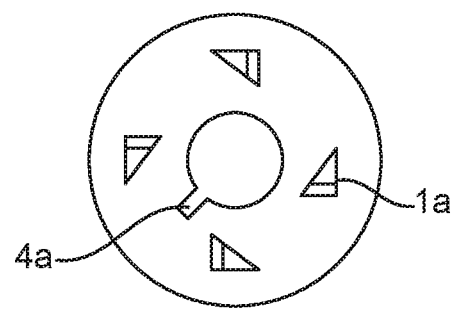

The third embodiment features a washer (FIG. 3A) with downward facing teeth which has at least one cut which is generally radially directed (4a) from the edge of its central hole of a width and to a length sufficient for the bolt/screw thread to pass through. There can be many ways to implement the washer of this embodiment, but mutatis mutandis they are all considered to be within the spirit and scope of this invention.

Figure 4:
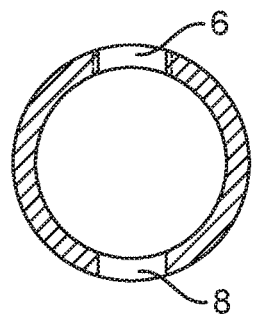
FIG. 4 is a side view of rounded nut with uniform wall thickness.
Figure 4A:
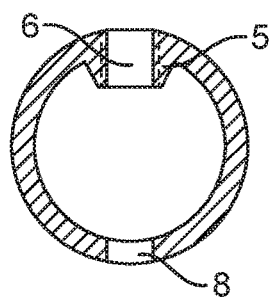
FIG. 4A is a side view of rounded nut with thicker part where the threaded hole is located.
Figure 4B:
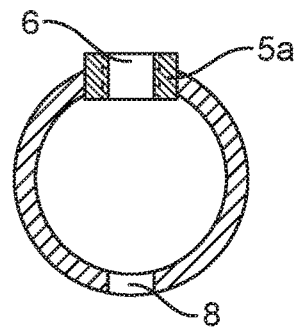
FIG. 4B is a side view of rounded nut with a round insert comprising threaded hole.
Figure 4C:
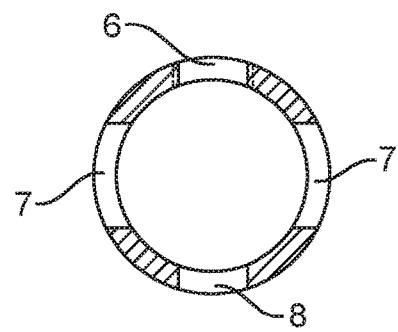
FIG. 4C is a side view of rounded nut of uniform larger thickness and cutouts on its sides.
Figure 4D:
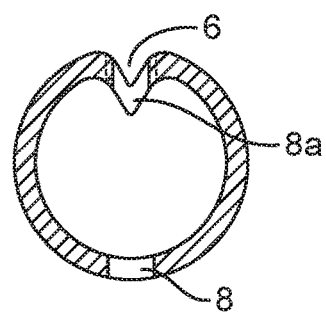
FIG. 4D is a side view of rounded nut with uniform cross-sectional profile thickness and a pleat on its top.
Figure 4E:
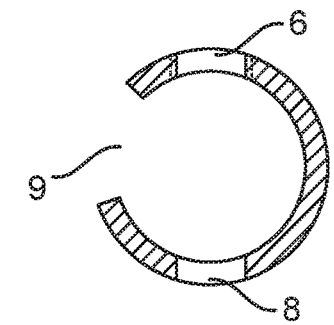
FIG. 4E is a side view of rounded nut with uniform cross-sectional profile thickness and a gap on its side.
Figure 4F:
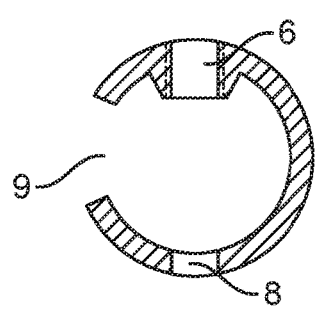
FIG. 4F is a side view of rounded nut with thicker top and a gap on its side.
Figure 4G:
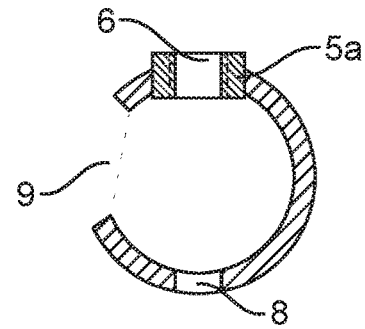
FIG. 4G is a side view of rounded nut with uniform cross-sectional profile thickness, thicker insert on top and a gap on its side.

The fourth embodiment is intended as an improved replacement for the cylindrical nut; the nut will have a rounded or partly rounded or curved hollow profile suitable for being placed into a cylindrical hole. In its first version the nut will have a threaded hole on top and an unthreaded hole of a diameter sufficient to put through it a bolt or screw that is to be screwed into the threaded hole (FIG. 4). As the walls of such rounded profile, which is to be elastically deformed during tightening while resting inside a hole in the wood, have to be of a predetermined, limited thickness or else the wood will be impacted, it will not in many cases have sufficient thickness for the number of thread coils required for the level of axial load in this connection. Accordingly (FIG. 4A) the upper part of the nut cross-section can be made thicker (5), for example by means of extruding this profile. Alternatively (FIG. 4B) a thicker round insert (5a) can be pressed into a larger hole in the upper part of the profile and then a threaded hole (6) can be made in said thicker insert. Another way of implementing the nut of first version is to provide a profile of larger thickness (FIG. 4C) sufficient for the number of thread coils required in the threaded hole, but to prevent such nut from being too rigid and unsuitable for the compression by the limited axial force that can be applied to the nut placed in a hole in wood, cut-outs (7) are made in its sides to make the nut profile more flexible. Still another way to address the need to have the required number of coils in an otherwise thin profile (FIG. 4D) is to have a pleat (8) on top of the nut. Said pleat (8) is of predetermined depth through which a threaded hole (6) runs; while it will not have complete thread coils in this arrangement, it will have a sufficient number of the incomplete thread coils for the amount of its axial load. The nut of this version of this embodiment works in a way similar to the spring washer by elastically compressing and then exerting an elastic force onto the thread, thus producing substantial friction in said thread and thereby preventing bolt or screw loosening.

Figure 4J:
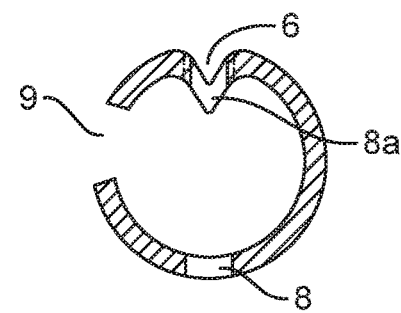
FIG. 4J is a side view of a rounded nut of uniform thickness, pleat on top and gap on its side.
Figure 5:
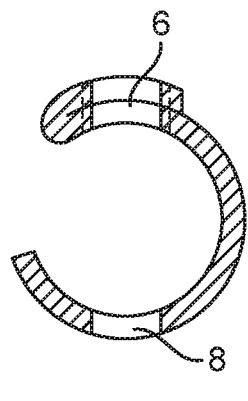
FIG. 5 is a side view of a rounded nut with folded edge and a gap on its side.
Figure 5A:
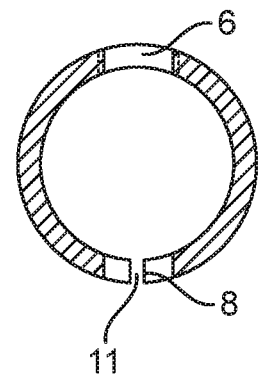
FIG. 5A is a side view of a rounded nut with uniform thickness and gap on its bottom.
Figure 5B:
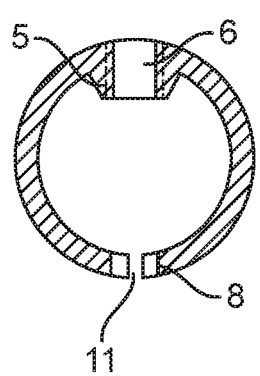
FIG. 5B is a side view of a rounded nut with thicker top and a gap on its bottom.
Figure 5C:
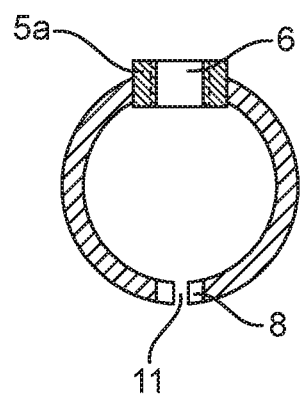
FIG. 5C is a side view of a rounded nut with insert on top and a gap at the bottom.

The second version of the nut of this embodiment is similar (FIGS. 4E, 4F, 4G, 4J) to the nut of first version in its various implementations, but has a gap (9) on its side. For the implementation with a pleat (FIG. 4J) for the second version the pleat is to narrow at a predetermined torque level as the nut is compressed during tightening closing the gap (9), thereby jamming the bolt at that predetermined torque level to prevent over-tightening. In addition to these implementations of second version of fourth embodiment, there is another implementation (FIG. 5) not present for other versions where the edge is folded (10) and through the folded part of double thickness the threaded hole (6) is made. For the various implementations of the second version of this embodiment the nut works by being elastically compressed and therefore exerting a force upon the threads and thus producing a friction force in the threads to prevent loosening. For the implementation with a pleat (FIG. 4J) there is also bolt jamming due to the pleat narrowing. Another factor in this nut's operation is the misalignment between the threaded and unthreaded holes that happens during nut's compression and the much increased friction force in the thread because of it, which in addition to prevention of loosening, if designed for that, acts to prevent overtightening beyond the designated level of axial load. Furthermore by selecting predetermined dimensions and shape of the nut, it can be made to bend the bolt thus making the threaded connection irreversible—for uses where disassembly is not intended.

Figure 5D:
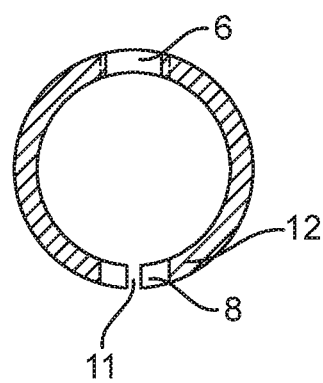
FIG. 5D is a side view of a rounded nut with gap at the bottom with bottom flattened.
Figure 5E:
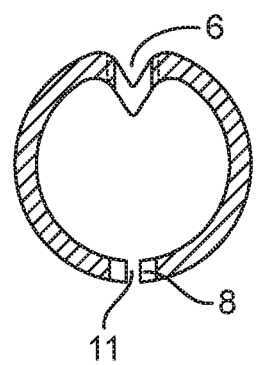
FIG. 5E is a side view of a rounded nut of uniform thickness, pleat on top and a gap at the bottom.

The third version of this embodiment is similar (FIGS. 5A, 5B, 5C, 5E) to the nut of first version in various implementations, but has a narrow gap or cut on its bottom (11), bisecting the unthreaded hole (8). Optionally, this version (FIG. 5D) may have a flat or nearly flat bottom (12) produced either by the edges being bent inward until they form a flat surface or by machining the bottom to produce flat surface. The nut works by means of edges on two sides of the gap at the bottom being pressed during compression towards the bolt/screw shank and gripping it, thereby preventing its further turning upon reaching the designated level of axial load. If the edges' thickness is no less than the shank's thread pitch they will grip the shank on the outside without penetrating the thread. For nuts with flat bottom; flat surface generally will not be touching the wood below, avoiding friction and thus producing stronger gripping and jamming of the bolt.

Figure 6:
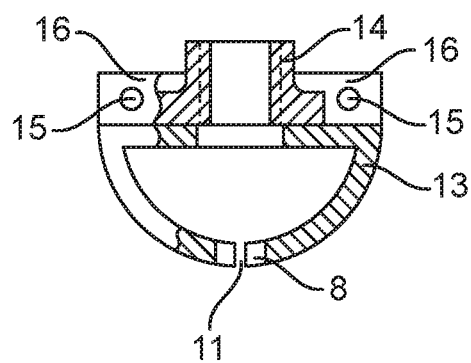
FIG. 6 is a side view of a nut with a rounded bottom with a gap at the bottom, flat top and a slider with the threaded hole.

Fourth version of this embodiment (FIG. 6) will have a rounded bottom or cradle (13) as a separate part with a narrow gap or cut bisecting the unthreaded hole (similarly to the nut of third version of this embodiment), while the slider with a threaded hole (14) will be mounted on the flat top of cradle (13) having another unthreaded hole (14a) and prevented from sliding out of it by 2 pins (15) inserted into walls (16). Two edges forming the cut (11) may optionally be made rounded to accommodate the possibility of the bolt shank deviating from the vertical direction. The fourth version of this embodiment is intended for connecting misaligned or curved surfaces as it has inherent adjustability, otherwise it works just like the third version wherein the edges forming the gap at the bottom narrow and press on the bolt gripping it and preventing from further turning. The nut of this embodiment can also be implemented like other versions of this embodiment (not shown), such as with rounded bottom part walls of predetermined thickness enabling said bottom part's elastic compression by a predetermined amount at the designated load level or having a gap on one side below the flat top of cradle (13). There can be many ways to implement the nuts of this embodiment, but mutatis mutandis they are all considered to be within the spirit and scope of this invention.

Figure 7:
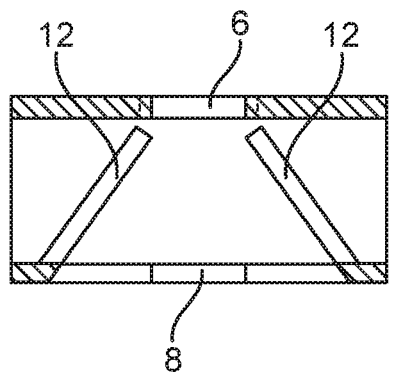
FIG. 7 is a frontal view of a rounded nut with compression grip tabs.

The fifth embodiment (FIG. 7) is largely similar to the elongated, rounded cross-section nuts of the fourth embodiment, but at least on two sides of the unthreaded hole (8) there are upturned tabs (12) which are of predetermined length in order to, when pressed down by the upper part (5) of the nut when it's compressing, come into contact with the threaded shank and grip it. There can be many ways to implement the nut of this embodiment, but mutatis mutandis they are all considered to be within the spirit and scope of this invention.

Figure 8:
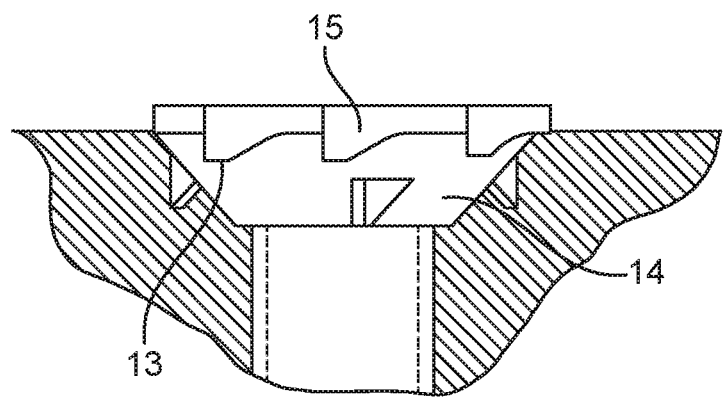
FIG. 8 is a view of screw inserted through a washer with perimeter indentations, deformed into conical shape.

The sixth embodiment (FIG. 8) is a system, comprising a washer of predetermined thickness and indentations (13) along its outer perimeter which is of predetermined diameter. The second component of this system is a screw or bolt, wherein screw head or bolt head which is to be used with this type of stopper washer has conical bottom (14) and said head's outline has features; corners, lugs or protrusions (15) matching the indentations along the washer's outer perimeter. There can be many ways to implement the system of this embodiment, but mutatis mutandis they are all considered to be within the spirit and scope of this invention.

6. SKETCHES AND DIAGRAMS

Provided separately

7. OPERATION

For the first embodiment (FIGS. 1 and 2) as the nut is tightened the teeth (1a) under the washer base are driven into the wood surface thereby immobilizing the washer. As the tightening is completed the flap or tab (2) is to be bent upward and pressed against a facet of the nut thereby immobilizing the nut. The nut thus protected from loosening needs to be only moderately tightened, far from approaching the over-tightened condition.

For the second embodiment (FIG. 3) the washer will be used in a manner similar to that of the first embodiment, but instead of a flap, the bracket (3) is to be bent upward and its tip (4) is to be pushed into the screw head's socket or slit for the screwdriver, thereby immobilizing it. The screw or bolt thus protected from loosening needs to be only moderately tightened, far from approaching the over-tightened condition.

For the third embodiment, during tightening the toothed washer is pressed by the flat bottom of the screw/head causing washer's teeth (1a) to sink into the wood thereby immobilizing the washer. The screw's thread passes through the radial cut in the washer (4a) extending from the edge of its central hole. Once the flat bottom reaches the washer the thread cannot go any lower and is prevented from turning by the radial cut in the immobilized washer through which it ran. Thus the screw is completely stopped and won't be excessively turned.

For the fourth embodiment (FIGS. 4-6), for the first version of this embodiment, as the threaded connection is assembled, the threaded end of the screw is pushed first through the unthreaded hole of the nut residing in the hole drilled in the wood, and then screwed into the threaded hole (6). As the threaded connection is tightened the upper part (5) is pulled towards the bottom part and deforms elastically, thus acting similarly to a spring lock-washer by creating a constant elastic force acting on the meshed screw and nut threads and thus causing static friction which is preventing loosening.

For the second, third and fourth versions of this embodiment, the operation of the nut was adequately described in the Description section and will not be reiterated here, but is included by way of reference as if fully set forth. For the fifth embodiment the operation of the nut was adequately described in the Description section and will not be reiterated here, but is included by way of reference as if fully set forth.

For the sixth embodiment when the screw is driven into the wood the washer's teeth sink into the wood first, thus immobilizing it, and then the washers central part is pulled and sinks into the wood forming a conical shape corresponding to that of the bottom of screw. The edge of the washer thus form a circular ridge with indentations (13). If the edge of the washer initially came raised at a predetermined angle, the ridge thus formed will be vertical at the end of tightening. Said ridge narrows during tightening, with indentations (13) coming into mesh with matching protrusions of the head (15) whereupon said head thus comes to a complete stop coinciding with completion of tightening.

What claimed is:

1. A hollow dowel nut for being placed into a cylindrical hole and to receive a threaded fastener, the hollow dowel nut comprising:
    a cross-sectional profile being at least partly curved, said hollow dowel nut being capable of being elastically deformed during tightening of the threaded fastener to exert an elastic force to produce friction onto a thread of the threaded fastener to prevent loosening, said hollow dowel nut having a threaded hole on its top and an unthreaded hole on its bottom, said unthreaded hole having a diameter sufficient to put a threaded shank of the threaded fastener through it for screwing the threaded shank into said threaded hole.

2. The dowel nut of claim 1 further comprising a structural feature on its top, having a threaded hole with a larger number of thread coils than said nut wall thickness would otherwise permit, wherein the structural feature is selected from the group consisting of; localized profile thickening of the wall and thicker insert pressed into suitable hole in the wall and pleat in the wall and fold of the wall onto itself.

3. The dowel nut of claim 1 further comprising a structural feature for jamming a threaded fastener to prevent loosening and overtightening, wherein the structural feature is selected from the group consisting of; a decreased curvature or a flat bottom, and a narrow gap bisecting the unthreaded hole at the bottom, and a gap on one side between the top and bottom of the nut, and the inclined tabs raising from the bottom and pointing at the threaded shank from two sides.

4. The nut of claim 1 further comprising a flat plate to which a curved bottom part is attached, said flat plate having a central hole and side walls along its length, a slider with a threaded hole placed on top of said flat plate and two stopper pins in said side walls limiting said slider longitudinal movement.

5. The nut of claim 4 further comprising a structural feature for jamming a threaded fastener to prevent loosening and overtightening, wherein the structural feature is selected from the group consisting of; a decreased curvature or a flat bottom, and a narrow gap bisecting the unthreaded hole at the bottom, and a gap on one side between the flat plate and curved bottom part of the nut, and the inclined tabs raising from the bottom and pointing at the threaded shank from two sides.

* * * * *